(12) United States Patent
Diamond et al.

(10) Patent No.: US 7,804,427 B1
(45) Date of Patent: Sep. 28, 2010

(54) DEVICE AND METHOD FOR AUTOMATIC RESET OF ENCODER

(75) Inventors: Eric Diamond, Dublin, OH (US); Jeff Davis, Marion, OH (US); Hugo Beltran, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 28 days.

(21) Appl. No.: 12/408,323

(22) Filed: Mar. 20, 2009

(51) Int. Cl.
  *H03M 1/22* (2006.01)
(52) U.S. Cl. .............................. 341/1; 341/11; 341/13
(58) Field of Classification Search ............... 341/1, 341/11, 13
  See application file for complete search history.

(56) References Cited

U.S. PATENT DOCUMENTS

| | | | |
|---|---|---|---|
| 4,161,649 A * | 7/1979 | Klos et al. | 377/2 |
| 4,427,970 A * | 1/1984 | Devol | 341/6 |
| 4,949,087 A * | 8/1990 | Miyazawa | 341/16 |
| 5,602,544 A | 2/1997 | Takahashi et al. | |
| 6,072,305 A | 6/2000 | Trainor et al. | |
| 6,072,944 A | 6/2000 | Robinson | |
| 7,630,471 B1 * | 12/2009 | Kibler et al. | 377/30 |
| 2003/0030570 A1 | 2/2003 | Netzer | |
| 2003/0040820 A1 | 2/2003 | Staver et al. | |
| 2004/0050139 A1 | 3/2004 | Comer et al. | |

FOREIGN PATENT DOCUMENTS

| | | |
|---|---|---|
| EP | 0053982 A1 | 6/1982 |
| JP | 59-60215 A | 4/1984 |
| JP | 63-279649 A | 11/1988 |
| JP | 5-133767 A | 5/1993 |
| JP | 2003-206100 A | 7/2003 |
| JP | 2004-170140 A | 6/2004 |
| JP | 2006-258453 A | 9/2006 |
| KR | 10-2005-0017372 A | 2/2005 |

* cited by examiner

*Primary Examiner*—Khai M Nguyen
(74) *Attorney, Agent, or Firm*—Standley Law Group LLP

(57) ABSTRACT

An encoder reset device and method that allows for an encoder to be automatically reset without operator intervention. A reset device of the present invention includes a microprocessor-based controller and associated programming for operating the reset device. As part of the automatic reset process, a reset device of the present invention is able to perform the connector pin jumpering necessary to resetting many encoders.

22 Claims, 12 Drawing Sheets

DEVICE AND METHOD FOR AUTOMATIC RESET OF ENCODER

BACKGROUND OF INVENTIVE FIELD

The present invention is directed to a device and method for resetting encoders. More particularly, the present invention is directed to a device and method for automating the encoder reset process, such as may be required during the replacement of a servo motor or another encoder-equipped device.

Encoders can be of various design and may be used in a variety of applications. Of particular interest is a rotary encoder. A rotary encoder is a sensor or transducer that is commonly used to convert the angular position of a device into an electronic signal.

Encoders are commonly found on servo motors and other rotation-producing devices. As such, encoders may be found in a number of industrial applications, such as on robots, lift devices, transfer devices, and a variety of other automated equipment. Encoders are typically integral to such devices. Such encoders would be well known to one skilled in the art and, therefore, need not be described in greater detail herein.

As would also be understood by one skilled in the art, the rotary devices with which such encoders are commonly associated generally require periodic replacement—whether due to normal wear or an abnormal failure. Consequently, when such a device is replaced, a new encoder is also introduced.

When installing a new rotary device, such as a servo motor with an integral encoder, it is normally required that the encoder be reset prior to use. Currently, a typical encoder reset process involves the manual jumpering of several pins on an associated encoder connector, connection of the encoder to the motor controller for charging of the encoder, disconnection of the encoder from the controller, re-jumpering of the encoder connector, and reconnection of the encoder to the controller. As such, it can be easily understood that such a process is inefficient and time consuming (especially when a large number of encoder-employing devices must be regularly replaced), and must be performed at the location of use. Further, mistakes are commonly made during a typical reset process, such as inadvertent contact with incorrect connector pins during the manual jumpering thereof.

Devices for semi-automating an encoder reset process are also known. These devices are an improvement over the above-described manual reset process that is typically practiced. Nonetheless, use of these known devices still requires some manual intervention, as such devices require that an operator initiate a separate charging and reset process, monitor encoder voltages, relocate a connecting cable, etc.

Therefore, there remains a need for a device and method for truly automating and, therefore, further simplifying the encoder reset operation. It is also desirable to provide an encoder reset device and method that can communicate with and operate to reset an encoder without using the actual motor controller with which the encoder has been or will be associated. By eliminating the need to use the motor controller, such a device and method would allow for an encoder to be reset while removal of the current rotary device is ongoing. Offline resetting of an encoder would also thus be provided for. An encoder reset device and method of the present invention has such capabilities.

SUMMARY OF GENERAL INVENTIVE CONCEPT

An encoder reset device and method of the present invention provides for the automatic resetting and charging of a an encoder. An encoder reset device of the present invention preferably includes an enclosure for housing a power supply and the various circuitry (described in more detail below) necessary to perform the automatic encoder reset process.

An encoder reset device of the present invention is capable of performing all switching and voltage checking that is required during the encoder reset process. Preferably, an encoder reset device of the present invention has the ability to read absolute encoder data as well as encoder alarms.

During use, a cable having an appropriate connector is placed in electrical communication with the circuitry within the enclosure, and extends therefrom for connection to an encoder to be reset. Preferably, the reset device first attempts a quick reset procedure, which can be accomplished without having to discharge the encoder battery or capacitor. If the quick reset process is unsuccessful, the device may automatically move on to a full reset process, during which process the encoder battery or capacitor is substantially drained and recharged.

With the reset device connected to the encoder, the reset device also functions through the use of one or more relays to automatically and timely perform a required jumpering of the encoder connector pins. Preferably, a display screen is provided to display information such as battery or encoder voltage, various encoder serial data, error messages, etc. Once an encoder to be reset is connected to a reset device of the present invention, an operator need only press a start button on the device. The remainder of the reset process is fully automated.

From the foregoing brief description, it can be understood that an encoder reset device and method of the present invention is an improvement over known techniques and devices presently employed to effectuate encoder resetting. Thus, use of an encoder reset device and method of the present invention fully automates the encoder reset process, thereby further reducing the downtime associated with changing an encoder-equipped device. An encoder reset device and method of the present invention also permits an encoder to be easily reset and/or examined offline from the device or equipment with which the encoder will ultimately be used. In this manner, it can be ensured that backup encoders can be maintained in a ready to install and operate condition.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF THE EXEMPLARY EMBODIMENT(S)

Figure 1:
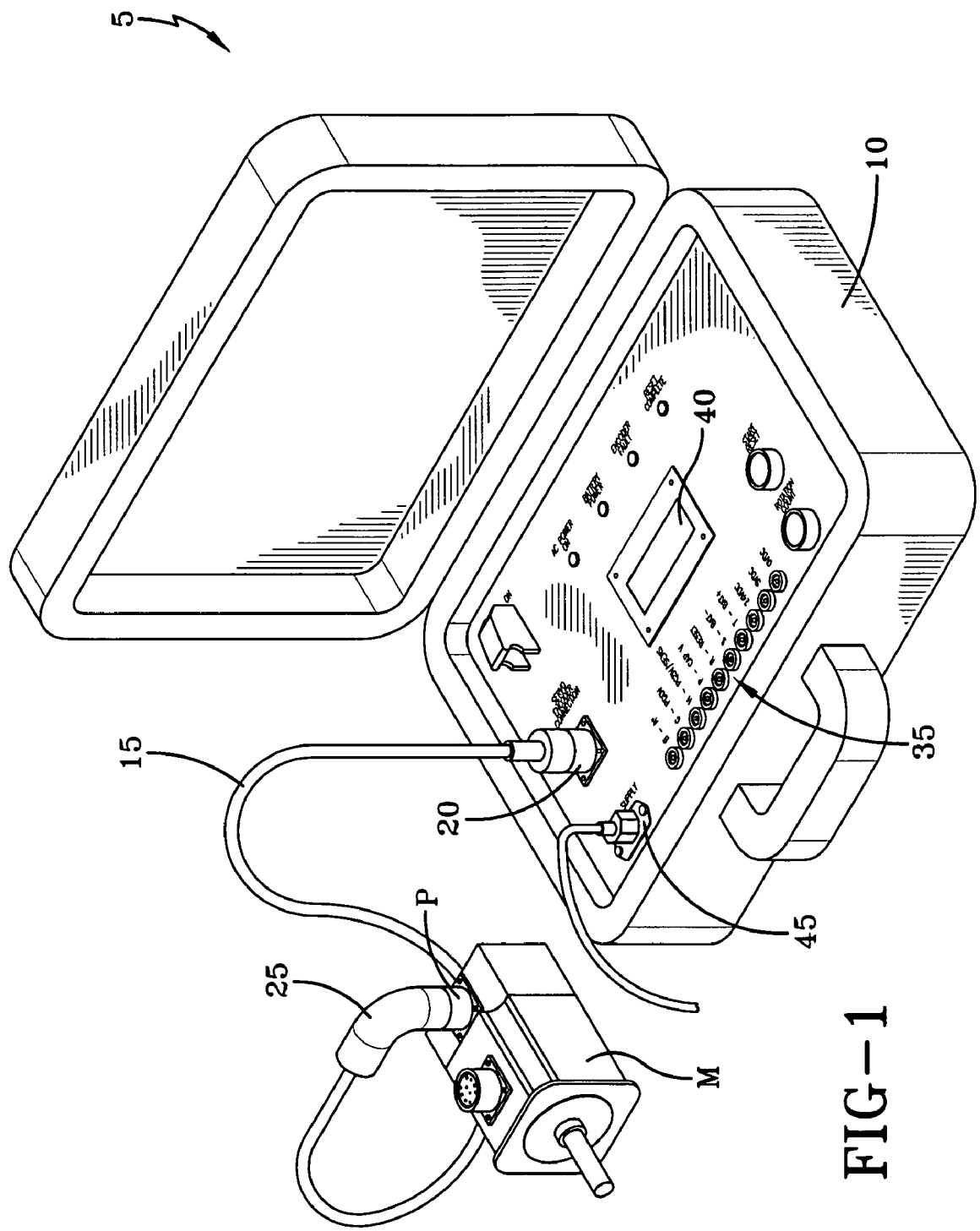
FIG. 1 illustrates one exemplary embodiment of an encoder reset device of the present invention connected to an encoder of a servo motor.
Figure 2:
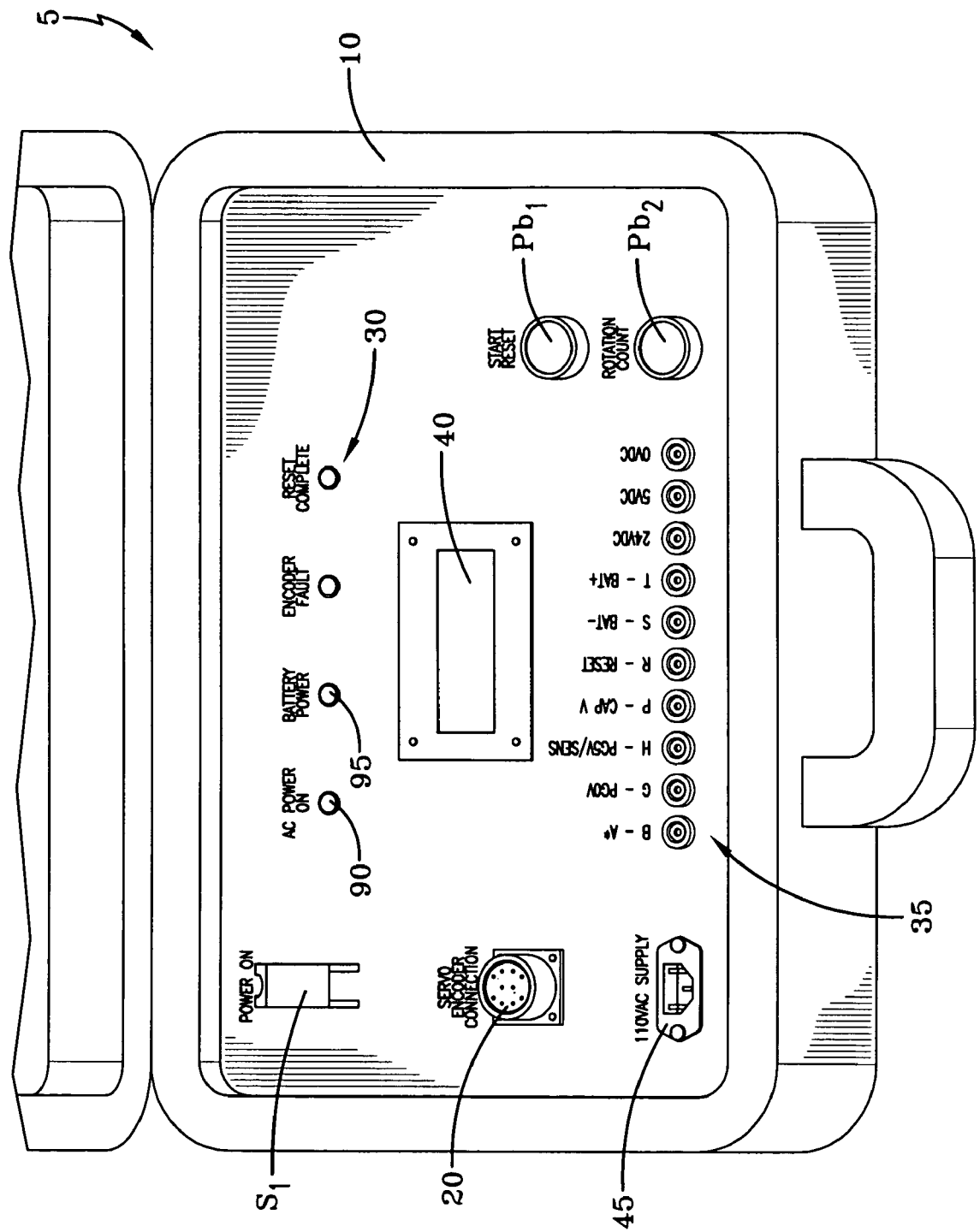
FIG. 2 is an enlarged view of an operator interface panel of the encoder reset device of FIG. 1.

An exemplary embodiment of an encoder reset device 5 of the present invention can be seen in FIGS. 1-2. As shown, this particular embodiment of the encoder reset device (reset device) 5 includes an enclosure 10 that houses the electronic components and circuitry associated with the encoder reset device 5 (see FIGS. 3-10). The enclosure 10 may be of virtually any shape and size, and may be constructed from a variety of materials. As shown, the enclosure 10 of this particular embodiment forms a case that protects the electronic components of the reset device and facilitates the transport thereof.

In FIG. 1, the reset device 5 is shown to be connected to an encoder of a servo motor M. Such connection is accomplished with a communication cable 15 that extends between a connecting port 20 of the reset device 5 and an encoder plug P located on the servo motor M. The encoder end of the communication cable 15 terminates in an encoder connector 25 appropriate for connection to the particular plug P of the encoder (not shown) to be reset. The encoder connector 25 may be detachable. Detachability of the encoder connector 25 permits various encoder connectors to be interchanged with a single communication cable, thereby minimizing the number of cable/connector assemblies required to service different encoders. Alternatively, a separate communication cable/encoder connector assembly may be used for each different encoder to be serviced. Other means for effecting connection between an encoder reset device of the present invention and a variety of encoders/encoder connectors may also be employed, and all such means are considered to be within the scope of the present invention.

Many encoders, such as for example, Yaskawa brand encoders, require that several pins of the given encoder plug be jumpered (short circuited) one or more times during the reset process. As is described in more detail below, a device of the present invention functions to perform this necessary pin jumpering by timely activating one or more control relays. More specifically, various pins of an encoder connector of interest are wired to an appropriate number of relays, which relays can be activated as necessary to achieve the proper jumpering between said reset pins. Accomplishing pin jumpering in this manner offers increased flexibility over known jumpering techniques, and may eliminate the need for jumper wires, soldering, or other common pin jumpering techniques. The information necessary to properly jumper a connector for use in the reset process is available from encoder manufacturers and/or manufacturers of encoder-equipped devices.

A reset device of the present invention is designed to simplify the process of encoder reset. To that end, a reset device of the present invention generally requires only a limited number of control actuators. For example, as can be best observed in FIGS. 2-3, the reset device 5 includes only a "Power On" switch $S_1$ for turning on the reset device, a "Start Reset" device pushbutton $Pb_1$ for initiating an encoder reset operation, and an optional "Rotation Count" pushbutton $Pb_2$ that, when pressed, requests absolute position data from the encoder. Consequently, an encoder reset operation may be initiated with the device 5 by simply connecting an encoder of interest to the device, powering on the device, and depressing the Start Reset pushbutton. Of course, the control actuators of a given encoder reset device of the present invention may have different labels than those shown herein, and a differing number of actuators may be present.

Figure 3:
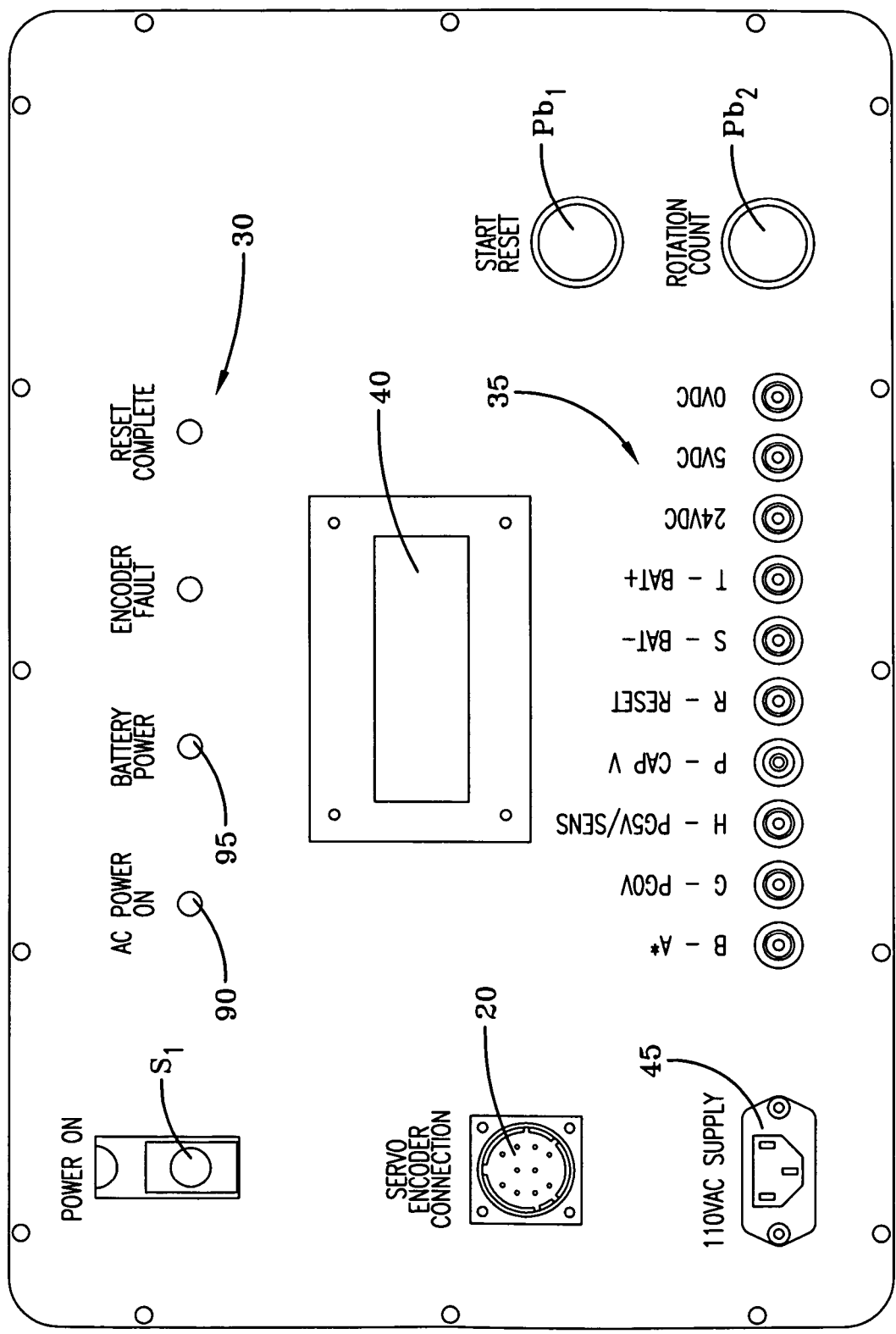
FIGS. 3-4 are panel drawings of the encoder reset device of FIG. 1.

As can also be best observed in FIGS. 2-3, a number of indicators may also be associated with the enclosure 10, such as various status-indicating LEDs and the like. For example, the exemplary reset device 5 illustrated herein is shown to include indicating LEDs 30 relating to power conditions of the reset device and the status of the reset operation. Additionally, this particular reset device 5 includes a number of test probe points 35 that can be used to perform a more detailed analysis of the encoder reset device and/or to perform troubleshooting operations relating thereto. Obviously, a virtually unlimited combination of status indicators and/or test probe points may be provided, and nothing herein is to be interpreted as limiting a reset device of the present invention to a configuration having the status indicators shown. Further, it is possible to construct a reset device of the present invention without any status indicators or test probe points.

Preferably, but not essentially, a reset device of the present invention is provided with a display device that is more advanced than indicator LEDs or the like. Such a display may be provided in conjunction with, or in lieu of, the simplistic status indicators 30 described above. Various types of such displays are available and would be known to those skilled in the art. Preferably, a selected display will be capable of conveying more detailed information to a user, such as without limitation, prompts, reset status messages, and other encoder and/or reset device information. Because a reset device of the present invention is capable of decoding serial data from an encoder, error messages, alarm codes and other serial status messages may be displayed. The exemplary reset device 5 of FIGS. 1-2 is shown to include a LCD display screen 40 for such display purposes.

A schematic diagram representing the various components and related circuitry of the exemplary encoder reset device 5 is shown in FIGS. 3-10. As can be best understood by reference to FIGS. 4 and 8-9, the exemplary reset device 5 is designed to operate on AC power (120 VAC in this particular example) and includes a receptacle 45 for connection to an appropriate AC power source. This particular reset device 5 also includes separate power supplies 50, 55 that convert the incoming AC power into 5 VDC and 24 VDC, respectively. A 24 VDC battery pack 60, and a 24 VDC battery charger 65 for effectuating the recharging thereof are also supplied. The battery pack 60 may be used to power the device 5 when AC power is not available.

A microprocessor-based device 70 (e.g., PLC) is also present for overseeing operation of the reset device 5. Depending on the encoder(s) with which they will be used and/or the selected PLC, other embodiments of a reset device of the present invention may include one or more power supplies that may be different from those shown in FIG. 4. A battery 75 is preferably also provided to prevent the receipt of an encoder battery alarm after a reset operation is completed.

Figure 4:
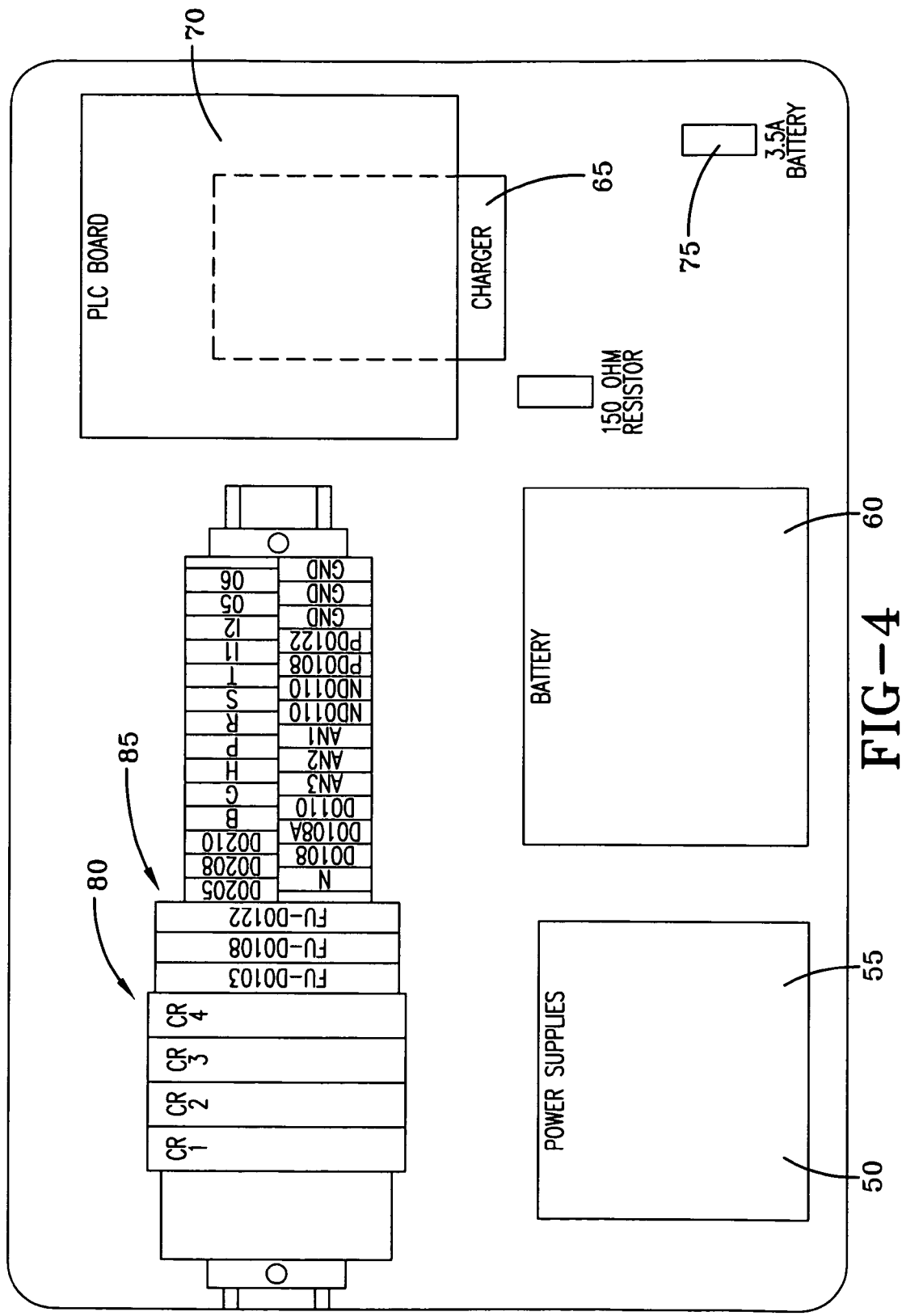
Figure 5:
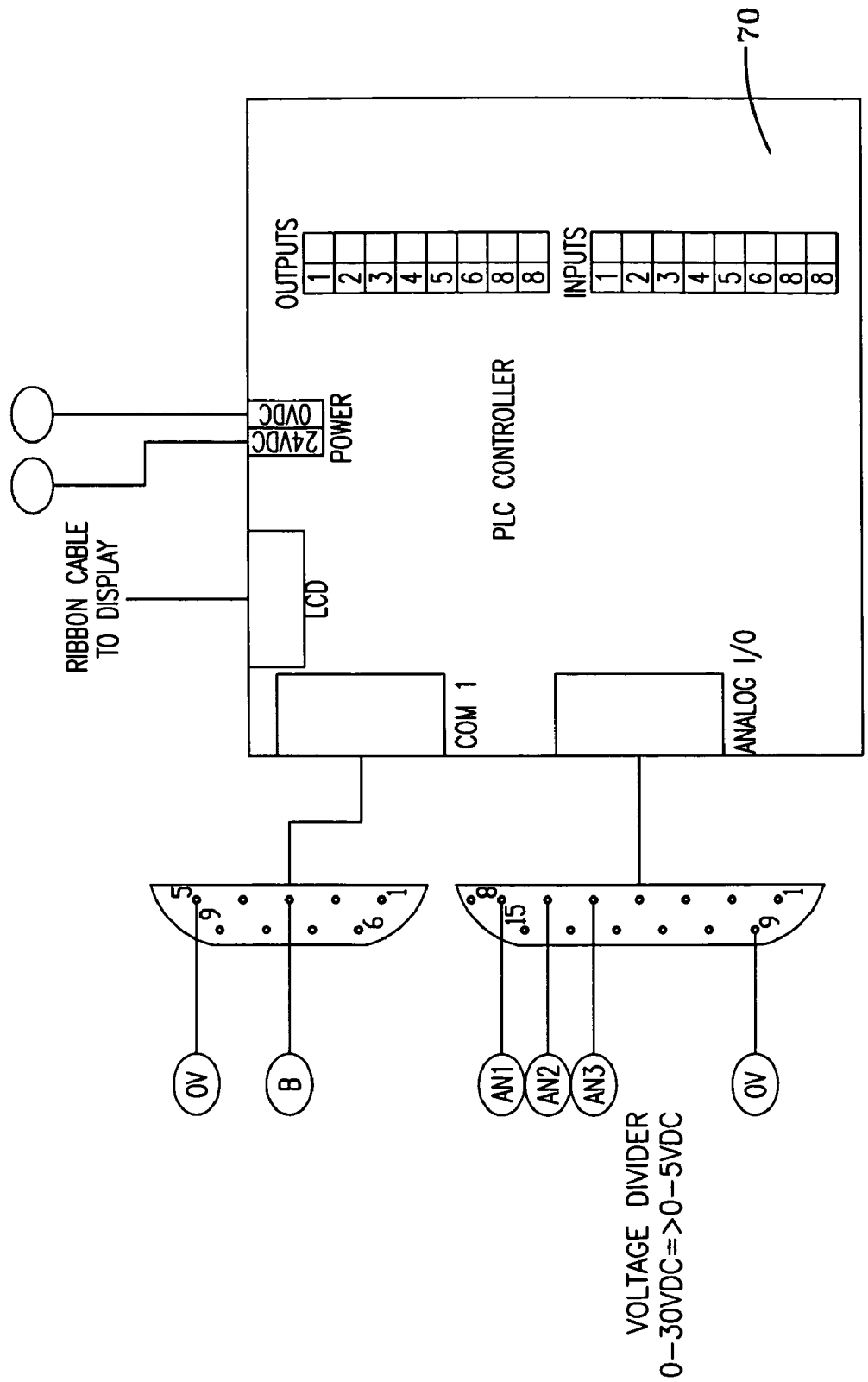
FIGS. 5-10 depict a schematic representation of various components of the encoder reset device of FIG. 1.
Figure 6:
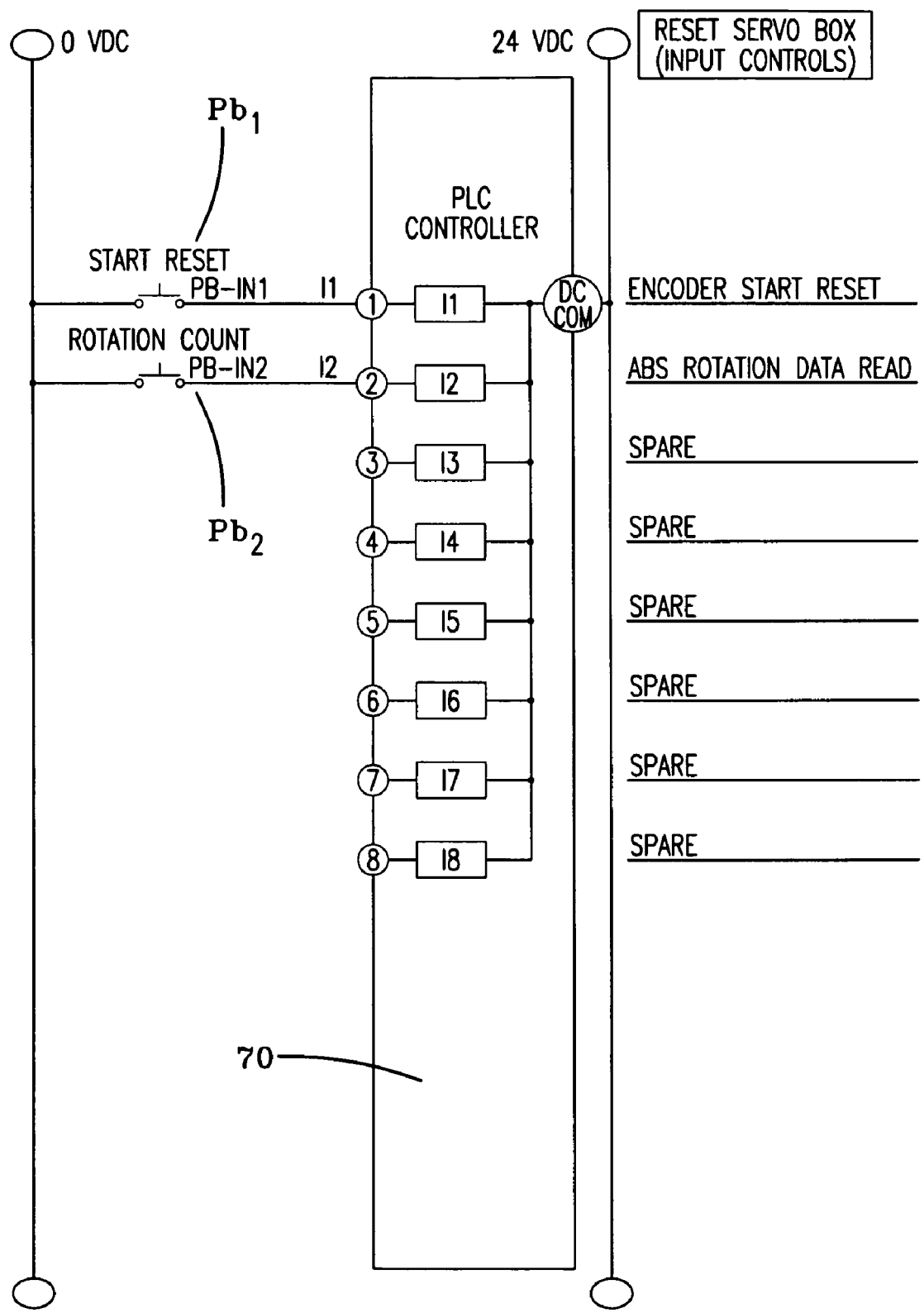
Figure 7:
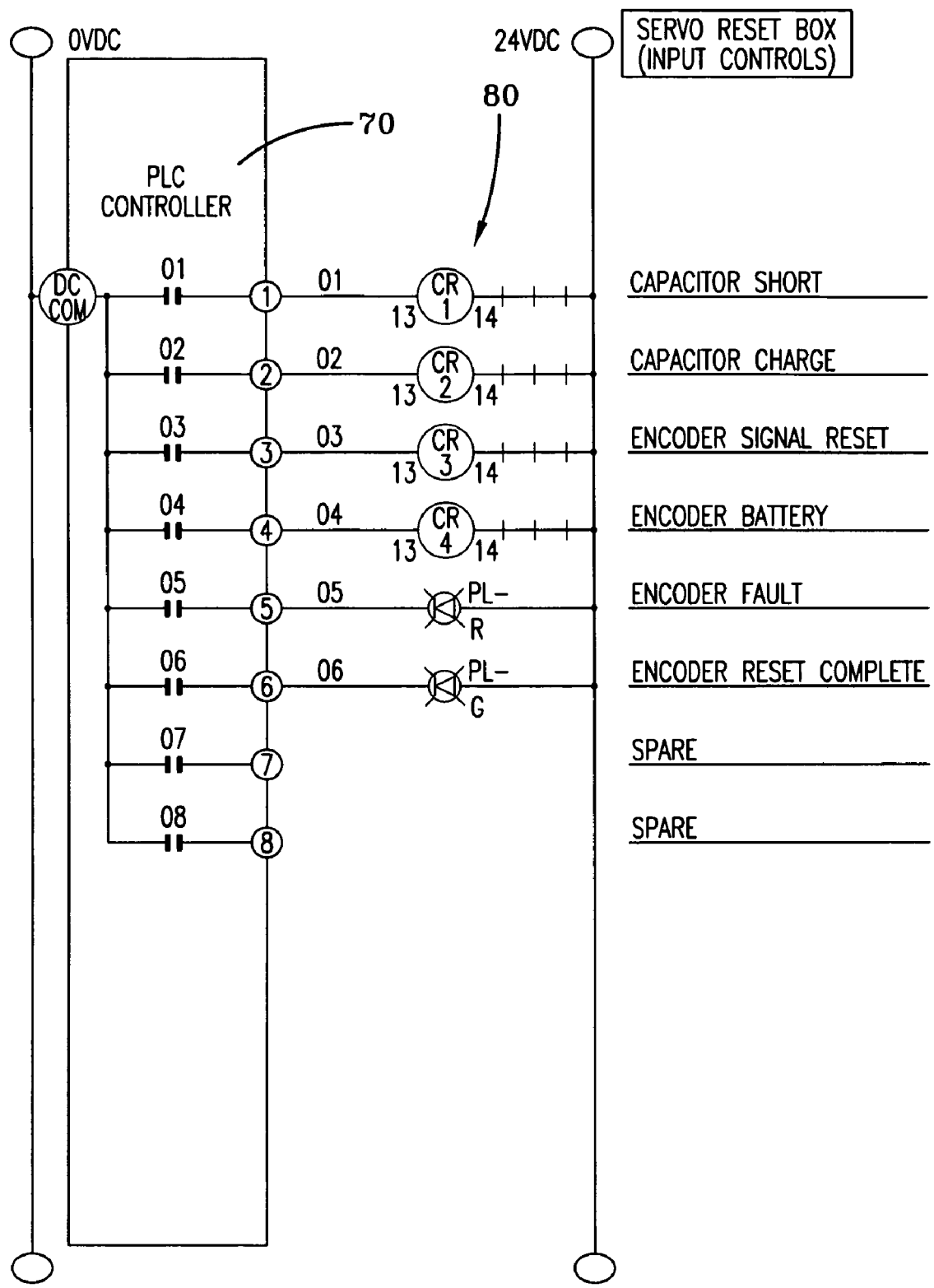
Figure 8A:
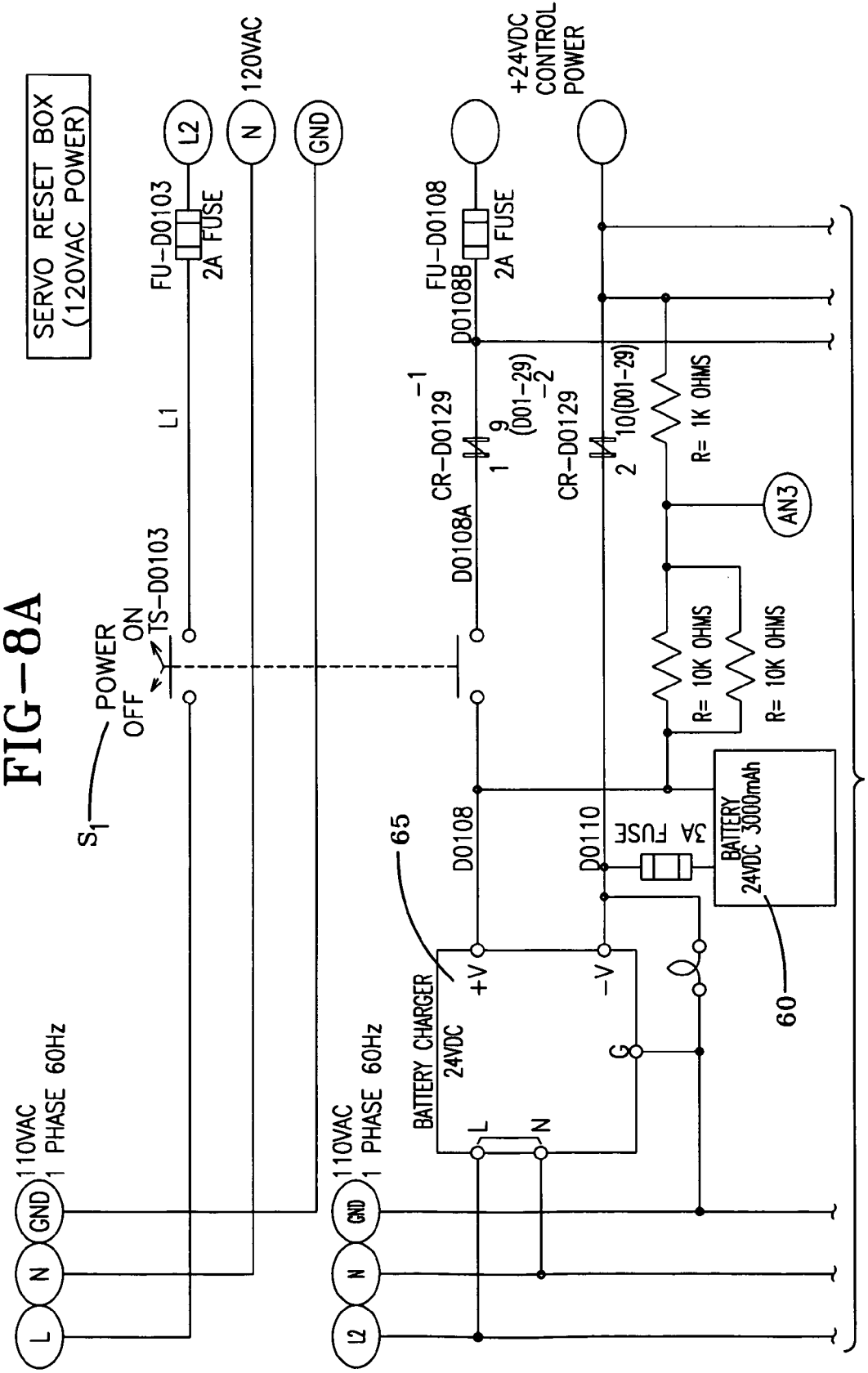
Figure 8B:
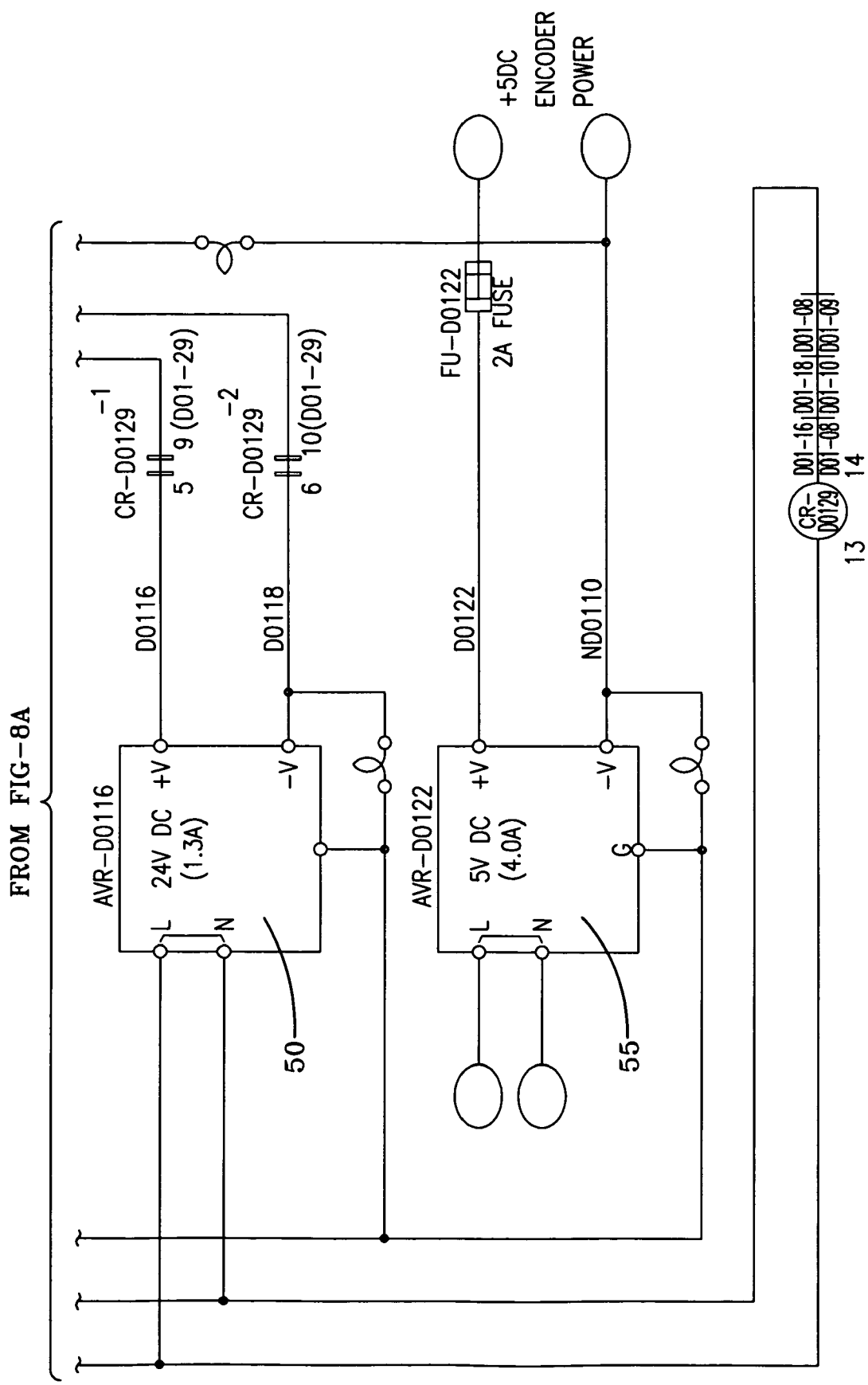
Figure 9:
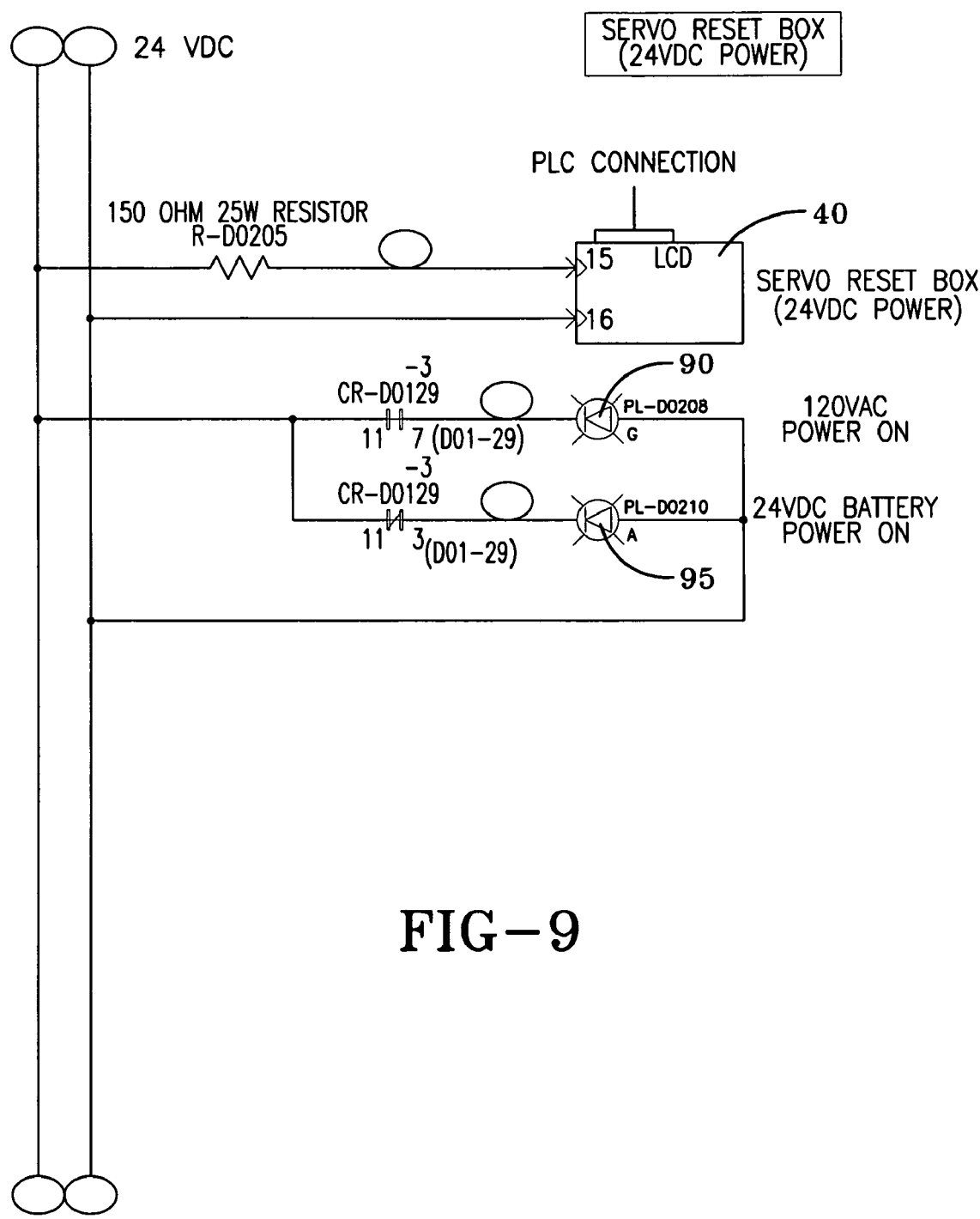
Figure 10:
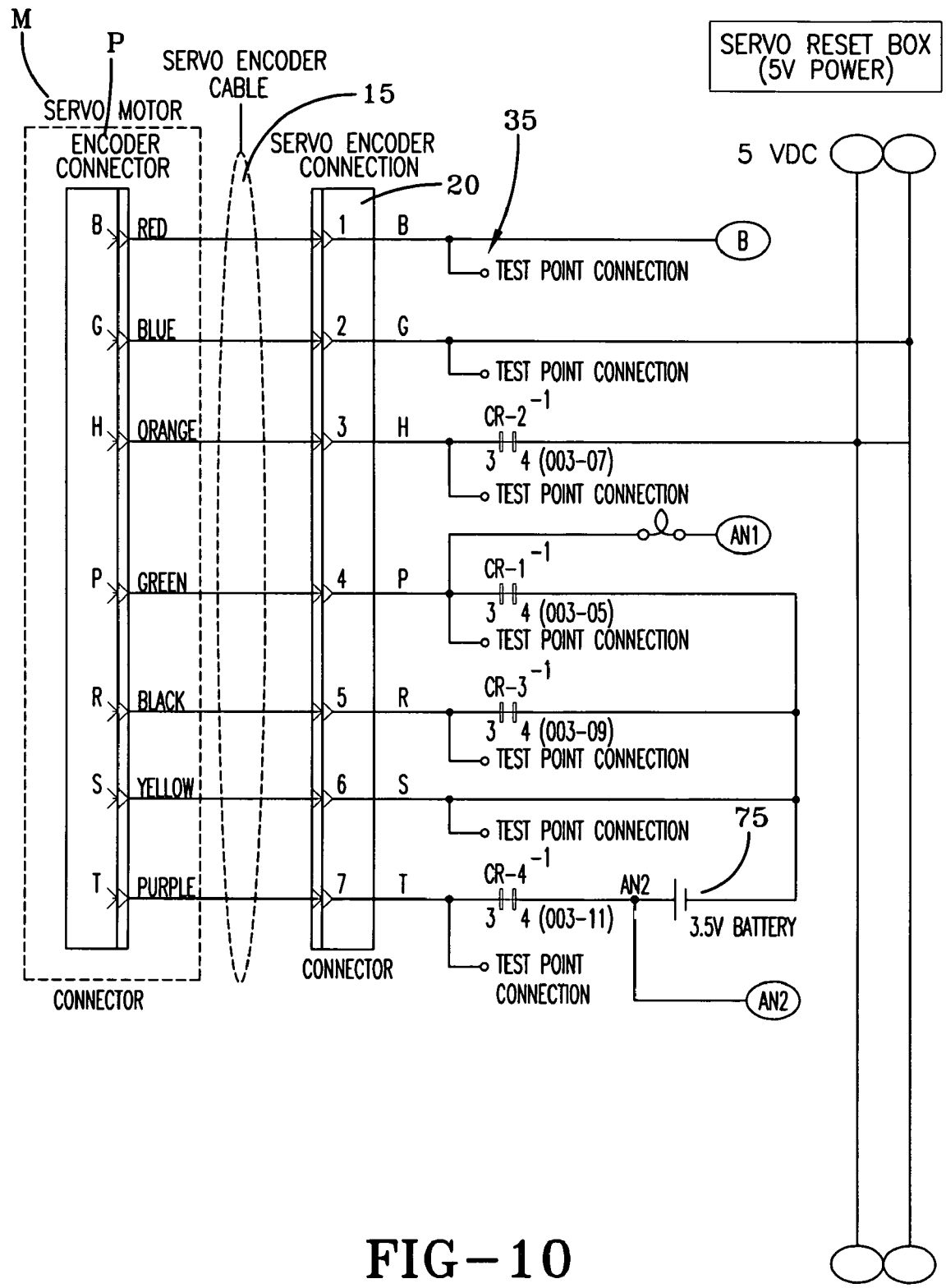

As shown in FIG. 4, the exemplary reset device 5 further comprises a number of control relays 80, the various functions of which are shown in FIGS. 7-9. Connection of the PLC 70 and connection of the reset device 5 to an encoder to be reset is illustrated in FIGS. 5 and 9-10. Preferably, one or more fuses 85 or breakers are provided to protect the reset device 5 circuitry.

Figure 11:
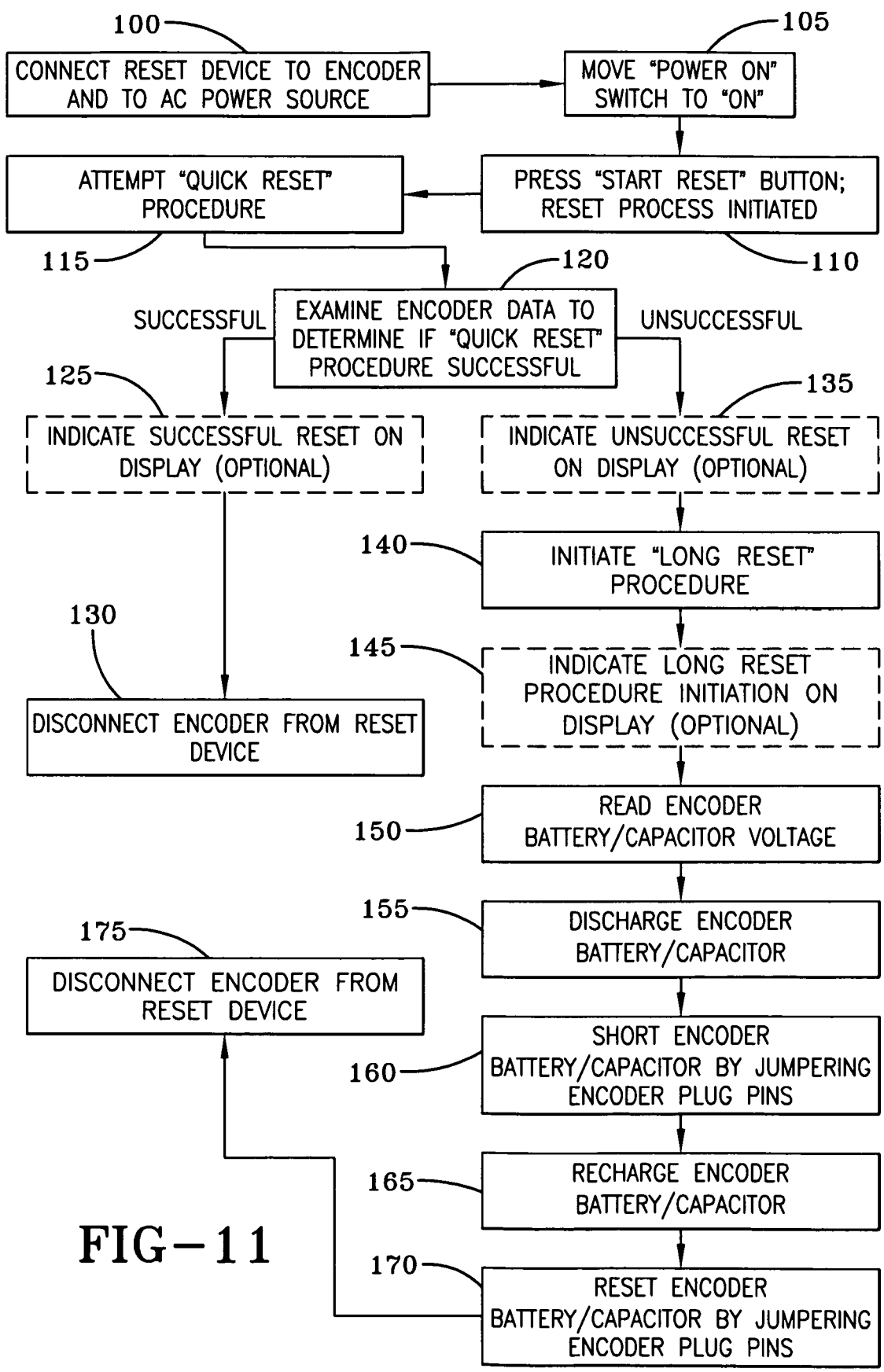
FIG. 11 is a flowchart illustrating the steps involved in one method of using an exemplary encoder reset device of the present invention.

One method of operation of the exemplary encoder reset device 5 described and shown herein is represented in the flowchart of FIG. 11. In operation, the reset device 5 is connected to an encoder to be reset 100, as described above. The reset device 5 is also connected to an AC power source by means of an appropriate cable and the reset device receptacle 45. Alternatively, the reset device 5 can run on battery power if no source of AC power is available. The "Power On" switch $S_1$ is then moved to the "on" position 105. Preferably, but not necessarily, the power on or equivalent switch is a normally open switch, and may be of the toggle variety. Placing the power on switch $S_1$ in the "on" position supplies electrical energy to at least the 24 VDC power supply 50 and the 5 VDC power supply 55 that then, in this case, provide 24 VDC control power and 5 VDC encoder power, as shown. In this embodiment, powering on the reset device 5 also illuminates 210 corresponding AC Power On or Battery (DC power on) LEDs 90, 95.

With the reset device 5 powered on, depressing the "Start Reset" button Pb$_1$ initiates the encoder reset process 110. As can be understood by reference to the schematic diagram of FIGS. 3-10 and the flow chart of FIG. 11, the encoder reset process proceeds automatically, without any required intervention on the part of an operator.

In the encoder reset device embodiment shown herein, a quick reset procedure is first attempted 115, wherein no draining of the encoder capacitor or battery occurs. At the end of the quick reset procedure, the reset device 5 examines the encoder data to determine if the reset procedure was successful 120. If so, such is preferably indicated 125 on the LCD display 40 and the encoder may be disconnected 130 from the reset device 5. If the quick reset procedure was unsuccessful, such may also be indicated to a user 135. Upon determination that a quick reset procedure was unsuccessful, the reset device 5 preferably automatically initiates a long reset procedure 140. Initiation of the long reset procedure may be indicated to an operator 145.

The various steps of an exemplary long reset procedure may include, without limitation, reading the voltage of the encoder's battery or capacitor 150, discharging the encoder's battery or capacitor 155, shorting the encoder's battery or capacitor 160 by jumpering appropriate pins of the encoder plug P, and recharging the encoder's battery or capacitor 165. Once the encoder's battery or capacitor has been sufficiently recharged, the reset device 5 operates to reset 170 the encoder by jumpering the appropriate pins of the encoder plug P. Once the encoder has been reset, the reset device 5 can be disconnected therefrom 175.

Various status messages may be displayed during the long reset procedure to indicate the progress thereof. As would be apparent to one skilled in the art, the number, frequency and content of such messages may vary. Of course, resetting of an encoder without displaying any status messages is also possible.

While one exemplary embodiment of a reset device 5 is depicted in the drawing figures and has been described above, it is to be understood that a multitude of modifications could be made thereto and still fall within the scope of the present invention. For example, the appearance of a reset device of the present invention, the number and type of actuator controls present, and the exact circuitry may vary while still performing the same function. Furthermore, while the exemplary embodiment of the reset device 5 has been described with respect to charging and resetting a particular exemplary encoder (e.g. a Yaskawa encoder), it is to be understood that a reset device of the present invention can be used with any number of encoders employing a similar reset process. Consequently, the size of the power source, the type of connector used, and the jumpering thereof can vary.

Therefore, while certain exemplary embodiments of an encoder reset device and method of the present invention have been described in detail above, these embodiments have been provided for purposes of illustration only, and nothing herein is intended to limit the present invention to the exemplary embodiment shown and/or described. As such, the scope of the invention is not to be considered limited by such disclosure, and modifications are possible without departing from the spirit of the invention as evidenced by the following claims:

What is claimed is:

1. An automatic encoder reset device, comprising:
   an enclosure for housing various components of said device;
   at least one power supply;
   a microprocessor-based controller in combination with a software program for controlling operation of said reset device;
   a communication cable in electrical communication with said at least one power supply and said microprocessor, said communication cable adapted for connection to a corresponding encoder plug;
   at least one relay in communication with said encoder plug so as to selectively and temporarily short circuit particular reset pins thereof; and
   a reset switch on said enclosure for initiating an encoder reset operation;
   whereby a flow of electrical energy from said at least one power supply to an encoder via said reset contacts thereof is operative to reset said encoder.

2. The encoder reset device of claim 1, wherein a first power supply is provided to operate said microprocessor-based controller at a first voltage and a second power supply of a different voltage is provided to reset an encoder.

3. The encoder reset device of claim 1, wherein said device is connected to an external source of AC power.

4. The encoder reset device of claim 3, wherein said at least one power supply converts said AC power to DC power of appropriate voltage(s).

5. The encoder reset device of claim 1, further comprising a battery, said battery capable of powering said device in lieu of said at least one power supply.

6. The encoder reset device of claim 1, further comprising a display screen for displaying messages to a user of said device.

7. The encoder reset device of claim 6, wherein said messages are related to the status of an encoder reset operation.

8. The encoder reset device of claim 1, further comprising a power switch for powering on said reset device.

9. The encoder reset device of claim 1, wherein said software program includes steps for performing a quick reset procedure during which a power supply of an encoder is not discharged.

10. The encoder reset device of claim 9, wherein said software program is adapted to automatically attempt said quick reset procedure before a full reset procedure.

11. The encoder reset device of claim 1, further comprising at least one test point wherein a test probe can be inserted to check a status of an encoder reset process.

12. The encoder reset device of claim 1, further comprising a voltage monitoring circuit that monitors the voltage of an encoder battery or capacitor.

13. The encoder reset device of claim 1, further comprising one or more illuminatable indicators on said enclosure for indicating the status of said device and/or an encoder being reset.

14. An automatic encoder reset device, comprising:
   a portable enclosure for housing various components of said device;
   a programmable logic controller located within said enclosure;
   a software program associated with said programmable logic controller for controlling operation of said reset device;
   a first power supply located within said enclosure, said first power supply for converting AC power to DC power and for supplying DC power to said programmable logic controller;
   a second power supply located within said enclosure, said second power supply for converting AC power to DC power and for supplying DC power for resetting an encoder of interest;

electronic circuitry located within said housing, said electronic circuitry including at least a charging circuit and a reset circuit in communication with said first power supply and said second power supply, respectively;

a communication cable in electrical communication with at least said second power source and said programmable logic controller, said communication cable adapted for connection to a corresponding encoder plug on said encoder of interest;

at least one relay in communication with said encoder plug so as to selectively and temporarily short circuit particular reset pins thereof; and a reset switch on said enclosure for initiating an encoder reset operation;

whereby said reset device is operative to reset said encoder of interest.

15. The encoder reset device of claim 14, further comprising a battery located within said housing, said battery in communication with said electronic circuitry and adapted to power said device in lieu of an AC power source.

16. The encoder reset device of claim 14, further comprising a display screen for displaying messages to a user of said device.

17. The encoder reset device of claim 14, wherein said software program includes steps for performing a quick reset procedure during which a power supply of an encoder is not discharged.

18. The encoder reset device of claim 14, further comprising a voltage monitoring circuit that monitors the voltage of an encoder battery or capacitor.

19. The encoder reset device of claim 14, further comprising one or more illuminatable indicators on said enclosure for indicating the status of said device and/or an encoder being reset.

20. A method of resetting an encoder, comprising:

providing an encoder reset device, said encoder reset device, further comprising:

a portable enclosure for housing various components of said device, a programmable logic controller located within said enclosure, a software program associated with said programmable logic controller for controlling operation of said reset device, a first power supply located within said enclosure for providing power to said programmable logic controller, a second power supply located within said enclosure for providing power for resetting an encoder of interest, electronic circuitry located within said housing, said electronic circuitry including at least a charging circuit and a reset circuit in communication with said first power supply and said second power supply, respectively, a communication cable in electrical communication with at least said second power source and said programmable logic controller, said communication cable adapted for connection to a corresponding encoder plug, at least one relay in communication with said encoder plug so as to selectively and temporarily short circuit particular reset pins thereof, and a reset switch on said enclosure for initiating an encoder reset operation, connecting said communication cable to a corresponding plug on an encoder of interest;

causing said reset device to run a quick reset procedure that attempts to reset said encoder of interest without discharging said encoder;

if said quick reset procedure is unsuccessful, causing said reset device to run a full reset procedure that, in seriatim, discharges said encoder of interest, recharges said encoder of interest, and shorts appropriate reset pins of said encoder of interest, to effectuate the resetting thereof; and disconnecting said communication cable from said encoder plug.

21. The method of claim 20, further comprising providing a voltage monitoring circuit that monitors the voltage of an encoder battery or capacitor.

22. The method of claim 20, further comprising providing a display device for displaying the status of a reset process to a user of said device.

* * * * *